(12) United States Patent
Yamamoto

(10) Patent No.: US 12,087,974 B2
(45) Date of Patent: Sep. 10, 2024

(54) BATTERY

(71) Applicant: TOYOTA JIDOSHA KABUSHIKI KAISHA, Toyota (JP)

(72) Inventor: Satomi Yamamoto, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 107 days.

(21) Appl. No.: 17/474,336

(22) Filed: Sep. 14, 2021

(65) Prior Publication Data

US 2022/0102820 A1 Mar. 31, 2022

(30) Foreign Application Priority Data

Sep. 30, 2020 (JP) .................... 2020-166044

(51) Int. Cl.
| | | |
|---|---|---|
| *H01M 50/569* | (2021.01) | |
| *H01M 4/13* | (2010.01) | |
| *H01M 10/48* | (2006.01) | |
| *H01M 50/54* | (2021.01) | |

(52) U.S. Cl.
CPC .......... *H01M 50/569* (2021.01); *H01M 4/13* (2013.01); *H01M 10/48* (2013.01); *H01M 50/54* (2021.01)

(58) Field of Classification Search
CPC .... H01M 50/569; H01M 6/50; H01M 6/5044; H01M 6/505; H01M 6/5055; H01M 6/5061; H01M 10/48; H01M 10/482; H01M 10/484; H01M 10/486; H01M 10/488; H01M 50/50; H01M 50/502; H01M 50/543

See application file for complete search history.

(56) References Cited

U.S. PATENT DOCUMENTS

| | | | |
|---|---|---|---|
| 10,026,932 B2 * | 7/2018 | Naito ................... | H01M 50/569 |
| 10,249,917 B2 | 4/2019 | Ichikawa et al. | |
| 2011/0008670 A1 * | 1/2011 | Han ..................... | H01M 4/661 |
| | | | 429/163 |
| 2013/0252048 A1 | 9/2013 | Teramoto et al. | |

(Continued)

FOREIGN PATENT DOCUMENTS

| | | |
|---|---|---|
| CN | 103325983 A | 9/2013 |
| JP | 2015-002140 A | 1/2015 |

(Continued)

*Primary Examiner* — Matthew T Martin
*Assistant Examiner* — Bartholomew A Hornsby
(74) *Attorney, Agent, or Firm* — Oliff PLC

(57) ABSTRACT

A battery including electrode bodies connected in series, wherein the battery is capable of detecting the voltage of each electrode body. The battery includes electrode bodies, and an exterior body including an inner region configured to house the electrode bodies, and the battery includes at least a first electrode body and a second electrode body, the first electrode body includes an electrode tab P, the second electrode body includes an electrode tab R having an opposite polarity to the electrode tab P, the electrode tab P and the electrode tab R are connected in the inner region, the battery includes a voltage detector placed so as to extend from the inner region to an outer region of the exterior body, and as the voltage detector, the battery includes a voltage detector α connected to a connecting portion of the electrode tab P and the electrode tab R.

10 Claims, 4 Drawing Sheets

(56) References Cited

U.S. PATENT DOCUMENTS

| | | | |
|---|---|---|---|
| 2014/0370366 A1* | 12/2014 | Higuchi | H01M 50/553 |
| | | | 429/158 |
| 2016/0043366 A1* | 2/2016 | Suzuki | H01M 50/529 |
| | | | 429/156 |
| 2016/0233474 A1* | 8/2016 | Kagami | H01M 10/0525 |
| 2016/0336614 A1* | 11/2016 | Hatta | B60L 50/64 |
| 2016/0380318 A1* | 12/2016 | Ichikawa | H01M 50/569 |
| | | | 429/7 |
| 2017/0047616 A1* | 2/2017 | Takahata | H01M 10/0431 |
| 2017/0110725 A1* | 4/2017 | Sakamoto | H01M 4/505 |
| 2018/0034011 A1* | 2/2018 | Tsuda | H01M 10/0568 |
| 2018/0277904 A1* | 9/2018 | Sasakawa | H01M 50/529 |
| 2019/0237824 A1* | 8/2019 | Jin | H01M 50/105 |
| 2019/0348662 A1* | 11/2019 | Iwamoto | H01M 10/0525 |

FOREIGN PATENT DOCUMENTS

| | | |
|---|---|---|
| JP | 2015-018737 A | 1/2015 |
| JP | 2015-210892 A | 11/2015 |
| JP | 6182374 B2 | 8/2017 |
| JP | 2019-145331 A | 8/2019 |
| JP | 2020-61221 A | 4/2020 |
| JP | 2020061221 A * | 4/2020 |

\* cited by examiner

BATTERY

TECHNICAL FIELD

The present disclosure relates to a battery.

BACKGROUND ART

A power source device comprising a battery assembly, wherein a plurality of batteries including an electrode body (a laminate of a cathode layer, a separator layer, and an anode layer) are used, and these batteries are connected in series, has been known. For example, Patent Literature 1 discloses a power source device comprising a battery assembly including a plurality of batteries, a bus bar module, a voltage detecting wire for detecting a voltage of each battery, a smoke exhausting duct, and a control board.

CITATION LIST

Patent Literature

Patent Literature 1: Japanese Patent No. 6182374

SUMMARY OF DISCLOSURE

Technical Problem

When a battery comprises a plurality of electrode bodies within an exterior body, and these electrode bodies are connected in series, although it is easy to detect the voltage between the terminals of the battery (battery voltage), it is difficult to detect the voltage of each electrode body.

The present disclosure has been made in view of the above circumstances, and a main object thereof is to provide a battery comprising a plurality of electrode bodies connected in series, wherein the battery is capable of detecting the voltage of each electrode body.

Solution to Problem

The present disclosure provides a battery comprising a plurality of electrode bodies, and an exterior body including an inner region configured to house the plurality of electrode bodies, and the battery includes at least a first electrode body and a second electrode body as the plurality of electrode bodies, the first electrode body includes an electrode tab P, the second electrode body includes an electrode tab R having an opposite polarity to the electrode tab P, the electrode tab P and the electrode tab R are connected in the inner region, the battery includes a voltage detector placed so as to extend from the inner region to an outer region of the exterior body, and as the voltage detector, the battery includes a voltage detector $\alpha$ connected to a connecting portion of the electrode tab P and the electrode tab R.

According to the present disclosure, since the battery comprises a specific voltage detector $\alpha$, the voltage of each electrode body may be detected.

In the disclosure, the first electrode body may include an electrode tab Q having an opposite polarity to the electrode tab P, the second electrode body may include an electrode tab S having an opposite polarity to the electrode tab R, and as the voltage detector, the battery may include at least one of a voltage detector $\beta$ connected to the electrode tab Q and a voltage detector $\gamma$ connected to the electrode tab S.

In the disclosure, the first electrode body and the second electrode body may be stacked along a thickness direction via an insulating member.

In the disclosure, the first electrode body and the second electrode body respectively may include: an anode current collector, a first anode layer, a first separator layer, a first cathode layer, and a first cathode current collector, placed in this order from one surface of the anode current collector, and a second anode layer, a second separator layer, a second cathode layer, and a second cathode current collector, placed in this order from another surface of the anode current collector.

In the disclosure, the voltage detector $\alpha$ may include an inner terminal portion connected to the connecting portion, an outer terminal portion placed in the outer region, and a first intermediate portion placed between the inner terminal portion and the outer terminal portion and also placed in the inner region.

In the disclosure, the first intermediate portion may include a planar region in at least a part thereof.

In the disclosure, the first electrode body and the second electrode body may include an insulating protective layer on a side thereof, and the first intermediate portion may be placed on a surface of the insulating protective layer.

In the disclosure, the first intermediate portion may be placed inside the insulating member.

In the disclosure, in a plan view, the first intermediate portion may be larger than a battery reaction region of the first electrode body and a battery reaction region of the second electrode body.

Advantageous Effects of Disclosure

The battery in the present disclosure is a battery comprising a plurality of electrode bodies connected in series, and exhibits an effect that the voltage of each electrode body may be detected.

DESCRIPTION OF EMBODIMENTS

Figure 1:
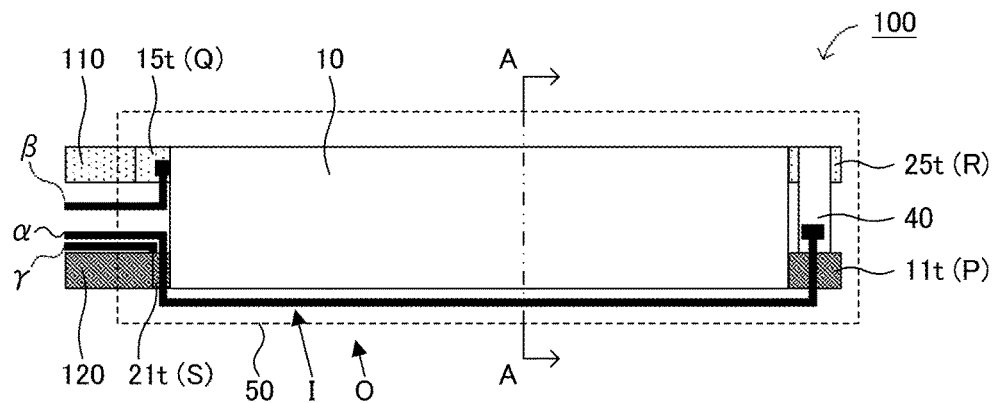
FIG. 1 is a schematic plan view illustrating an example of a battery in the present disclosure.

A battery in the present disclosure will be hereinafter described in detail referring to the drawings. Each figure shown below is schematically expressed, and the size and the shape of each member are appropriately exaggerated, to facilitate understanding. Also, in each figure, the hatching indicating the cross-section of a member is appropriately omitted. Also, in the present specification, in expressing an embodiment of arranging a member on another member, when merely expressed as "on" or "under", it includes both the case of arranging a member directly on or directly under another member so as to be in contact with another member, and the case of arranging a member above or below another member via still another member, unless otherwise specified.

Figure 2A:
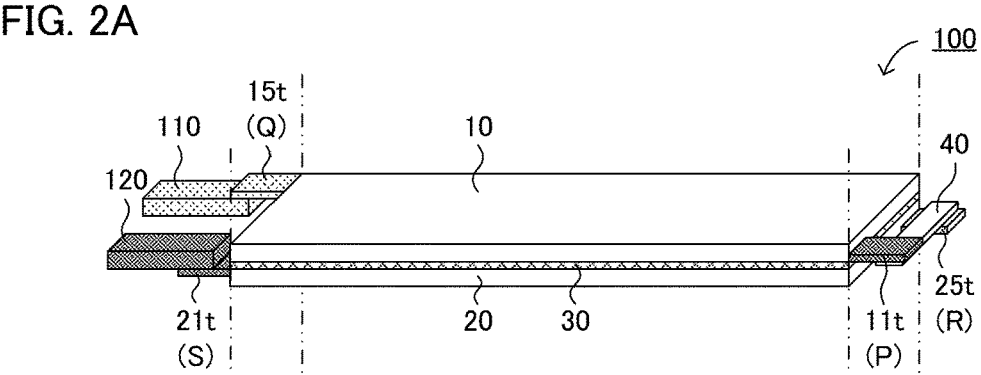
FIGS. 2A and 2B are schematic perspective views illustrating an example of a battery and structural members thereof in the present disclosure.
Figure 2B:
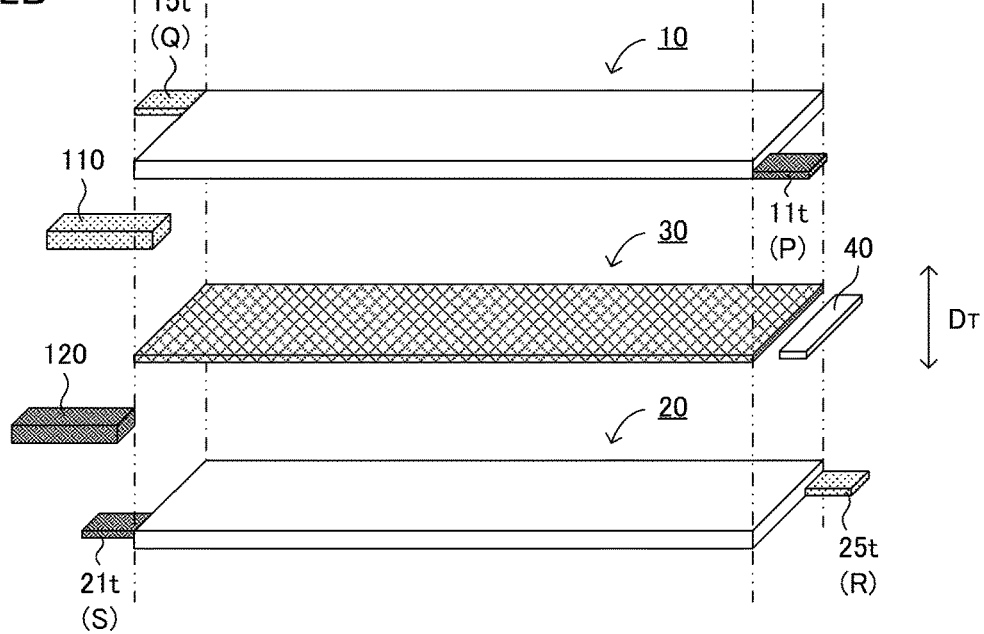

FIG. 1 is a schematic plan view illustrating an example of a battery in the present disclosure. FIGS. 2A and 2B are schematic perspective views illustrating an example of a battery and structural members thereof in the present disclosure. Specifically, FIG. 2A is a schematic perspective view of the battery shown in FIG. 1, and FIG. 2B is a schematic perspective view of the structural members of the battery shown in FIG. 2A. Incidentally, in FIGS. 2A and 2B, the disclosure of the voltage detector is omitted for the purpose of convenience.

As shown in FIG. 1 and FIGS. 2A and 2B, battery 100 comprises a plurality of electrode bodies (first electrode body 10 and second electrode body 20), and exterior body 50 including inner region I configured to house these. First electrode body 10 includes anode tab 11$t$ (electrode tab P), and cathode tab 15$t$ (electrode tab Q). Meanwhile, second electrode body 20 includes cathode tab 25$t$ (electrode tab R), and anode tab 21$t$ (electrode tab S). Electrode tab P and electrode tab R are connected in inner region I by connecting member 40. Also, as shown in FIG. 1 and FIGS. 2A and 2B, one end of cathode terminal 110 is connected to cathode tab 15$t$ (electrode tab Q) in inner region I, and another end of cathode terminal 110 is placed in outer region O. Similarly, one end of anode terminal 120 is connected to anode tab 21$t$ (electrode tab S) in inner region I, and another end of anode terminal 120 is placed in outer region O.

Also, as shown in FIG. 1, battery 100 comprises voltage detectors (voltage detector $\alpha$ and voltage detector placed so as to extend from inner region I to outer region O of exterior body 50. The voltage detector usually is a different member from cathode terminal 110 and anode terminal 120. Voltage detector $\alpha$ is connected to a connecting portion (connecting member 40) of electrode tab P and electrode tab R. Incidentally, in FIG. 1, voltage detector $\alpha$ is placed so as to pass over anode tab 21$t$ (electrode tab S), in a plan view. However, needless to say, between voltage detector $\alpha$ and anode tab 21$t$ (electrode tab S) is insulated.

Also, as shown in FIG. 1, when cathode terminal 110 is connected to electrode tab Q of the first electrode body, the voltage of the first electrode body may be determined by calculating the difference between the potential at cathode terminal 110 and the potential at voltage detector $\alpha$. Similarly, when anode terminal 120 is connected to electrode tab S of the second electrode body, the voltage of the second electrode body may be determined by calculating the difference between the potential at voltage detector $\alpha$ and the potential at anode terminal 120.

Also, as shown in FIG. 1, battery 100 may comprise voltage detector $\beta$ connected to electrode tab Q. In this case, the voltage of the first electrode body may be determined by calculating the difference between the potential at voltage detector $\beta$ and the potential at voltage detector $\alpha$. For example, even when the battery comprises other electrode body connected in series, in addition to the first electrode body and the second electrode body, the voltage of the first electrode body may be determined. Also, the battery may comprise voltage detector $\gamma$ connected to electrode tab S. In this case, the voltage of the second electrode body may be determined by calculating the difference between the potential at voltage detector $\alpha$ and the potential at voltage detector $\gamma$.

As desried above, according to the present disclosure, since the battery comprises a specific voltage detector $\alpha$, the battery is capable of detecting the voltage of each electrode body. Since it is able to detect the voltage of each electrode body, when abnormality occurs in the first electrode body or the second electrode body, the abnormality may be detected early so that the safeness may be further improved. Also, since it is able to detect the voltage of each electrode body, when a difference occurs between the voltage of the first electrode body and the voltage of the second electrode body, for example, the difference may be detected and corrected so that the cycle property may be further improved.

1. Structure of Battery

The battery in the present disclosure comprises a plurality of electrode bodies, and an exterior body including an inner region configured to house the plurality of electrode bodies. Also, the battery in the present disclosure includes at least a first electrode body and a second electrode body, as the plurality of electrode bodies.

The first electrode body includes electrode tab P, and electrode tab Q having an opposite polarity to electrode tab P. For example, in FIG. 1, electrode tab P is an anode tab, and electrode tab Q is a cathode tab. Meanwhile, the second electrode body includes electrode tab R having an opposite polarity to the electrode tab P, and electrode tab S having an opposite polarity to the electrode tab R. For example, in FIG. 1, electrode tab R is a cathode tab, and electrode tab S is an anode tab. Also, although not shown in the figure, when electrode tab P is a cathode tab, electrode tab Q is an anode tab, electrode tab R is an anode tab, and electrode tab S is a cathode tab.

As shown in FIG. 1, electrode tab P and electrode tab R are connected in inner region I. "Connection" in the present disclosure means at least an electrical connection, and may or may not mean a physical connection (direct contact), within the range not technically contradicting. As shown in FIG. 1 and FIGS. 2A and 2B, electrode tab P and electrode tab R are placed on the identical side of the electrode body, and respectively in contact with connecting member 40. Thereby, first electrode body 10 and second electrode body 20 are connected in series. Meanwhile, although not shown in the figures, electrode tab P and electrode tab R may be directly connected, not via the connecting member. The "connecting portion" in the present disclosure means a portion having a potential equal to the potential at electrode tab P and electrode tab R, regardless of the existence or non-existence of the connecting member.

Figure 3:
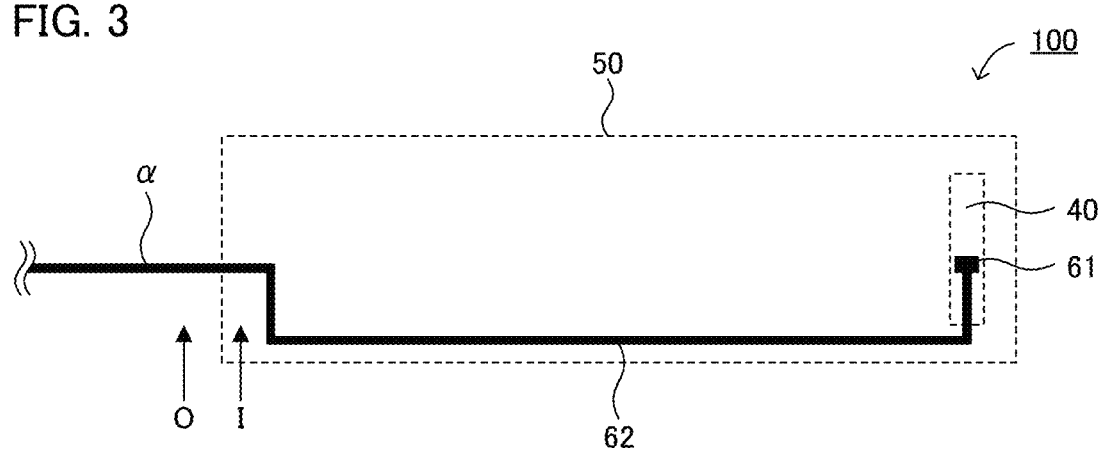
FIG. 3 is a schematic plan view illustrating an example of a voltage detector in the present disclosure.

Also, as shown in FIG. 3, battery 100 includes voltage detector $\alpha$ placed so as to extend from inner region I to outer region O of exterior body 50. Voltage detector $\alpha$ is connected to a connecting portion (connecting member 40) of electrode tab P and electrode tab R. Voltage detector $\alpha$ includes inner terminal portion 61 connected to the connecting portion (connecting member 40), an outer terminal portion (not shown in the figure) placed in outer region O of exterior body 50, and an intermediate portion placed between inner terminal portion 61 and the outer terminal portion. Further, the intermediate portion includes first intermediate portion (inner intermediate portion) 62 placed in the inner region, and a second intermediate portion (outer intermediate portion) placed in the outer region. Examples of the material for the voltage detector may include a metal. Also, a part of the surface of the voltage detector is preferably appropriately insulated, as necessary.

Inner terminal portion 61 is fixed so as to be connected to the connecting portion of electrode tab P and electrode tab R by, for example, welding, clipping and an adhesive. Outer terminal portion is usually connected to a control board. The shape of first intermediate portion 62 is not particularly limited, and the shape may be linear or planar. Among them, first intermediate portion 62 preferably includes a planar region in at least a part thereof. The reason therefor is to prevent a disconnection. The planar region refers to a region having a width of 5 times or more, with respect to the width of the smallest portion of the voltage detector (the length in the direction perpendicular to the extending direction of the voltage detector). Also, in FIG. 3, first intermediate portion 62 is placed along the longitudinal direction of the electrode body.

Also, as shown in FIGS. 2A and 2B, first electrode body 10 and second electrode body 20 may be stacked along the thickness direction DT via insulating member 30. Here, the following case is assumed: the first current collector placed on the most second electrode body 20 side in first electrode body 10, and the second current collector placed on the most first electrode body 10 side in second electrode body 20 have opposite polarities. For example, the following case is assumed: a first current collector is a cathode current collector, and a second current collector is an anode current collector. In this case, in order to connect first electrode body 10 and second electrode body 20 in series, the first current collector and the second current collector may be simply contacted with each other, and the need to provide insulating member 30 is low.

Figure 9:
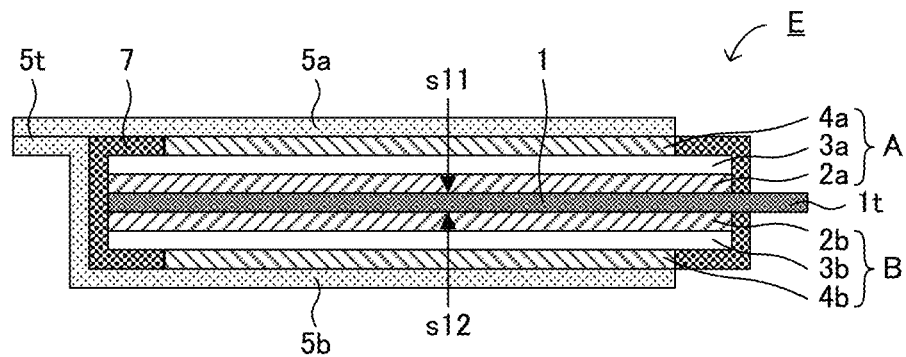
FIG. 9 is a schematic cross-sectional view illustrating an example of an electrode body in the present disclosure.

Meanwhile, a case wherein the first current collector and the second current collector have the same polarity is assumed. In this case, in order to connect first electrode body 10 and second electrode body 20 in series, it is preferable to place insulating member 30 between first electrode body 10 and second electrode body 20 and connect electrode tab P and electrode tab R, as shown in FIGS. 2A and 2B. In particular, when both the first electrode body and the second electrode body have a structure as shown in FIG. 9, that is, a structure including current collector having the same polarity on both sides, it is preferable to place the insulating member between the first electrode body and the second electrode body since the opposing first current collector and second current collector have the same polarity.

Examples of the material of the insulating member may include a resin, and specific examples of the resin may include polyolefin resins such as polypropylene (PP) and polyethylene (PE); a polyimide resin; and a polyphenylene sulfide resin (PPS). The insulating member is preferably larger than the first current collector (current collector placed on the most second electrode body 20 side in first electrode body 10) and the second current collector (current collector placed on the most first electrode body 10 side in second electrode body 20) in plan view. That is, it is preferable that the insulating member includes the first current collector and the second current collector in plan view. The reason therefor is to effectively insulate the first current collector and second current collector. Further, it is preferable that the insulating member is larger than the largest current collector in the first electrode body (for example, anode current collector 11 in FIG. 4) and the largest current collector in the second electrode body (for example, anode current collector 21 in FIG. 4) in plan view.

This is because, for example, the short circuit is less likely to occur, when the battery is pressurized (confined) from the outside.

Figure 4:
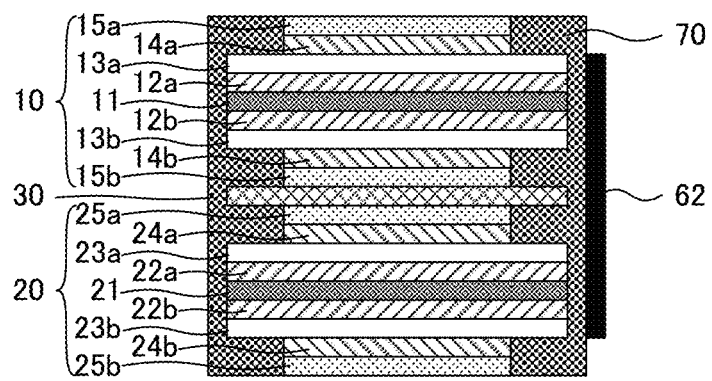
FIG. 4 is a schematic cross-sectional view illustrating an example of a voltage detector in the present disclosure.

FIG. 4 is a schematic cross-sectional view illustrating an example of a voltage detector in the present disclosure, and corresponds to the cross-sectional view taken along the line A-A in FIG. 1. In FIG. 4, first electrode body 10 includes anode current collector 11; first anode layer 12a, first separator layer 13a, first cathode layer 14a, and first cathode current collector 15a placed in this order from one surface of anode current collector 11; and second anode layer 12b, second separator layer 13b, second cathode layer 14b, and second cathode current collector 15b placed in this order from another surface of anode current collector 11. Meanwhile, second electrode body 20 includes anode current collector 21; first anode layer 22a, first separator layer 23a, first cathode layer 24a, and first cathode current collector 25a placed in this order from one surface of anode current collector 21; and second anode layer 22b, second separator layer 23b, second cathode layer 24b, and second cathode current collector 25b placed in this order from another surface of anode current collector 21. Also, insulating member 30 is placed between second cathode current collector 15b in first electrode body 10 and first cathode current collector 25a in second electrode body 20.

As shown in FIG. 4, first electrode body 10, and second electrode body 20 may include insulating protective layer 70 on the side thereof. By providing insulating protective layer 70 on the side thereof, the short circuit may be suppressed, or it is possible to suppress the positional deviation of each member constituting the electrode body. Also, first intermediate portion 62 may be placed on a surface of insulating protective layer 70. Examples of the material of the insulating protective layer may include a resin, and specific examples of the resin may include a urethane acrylate resin, an epoxy resin, and an olefin resin. Also, the resin may be a thermoplastic resin, and may be a cured resin (such as a cured product of a thermosetting resin or an ultraviolet curable resin).

Figure 5:
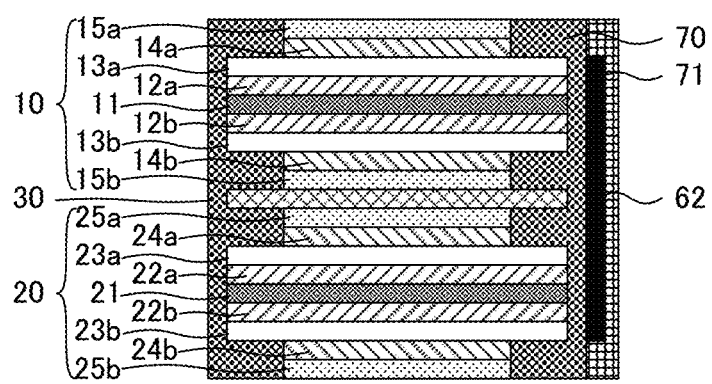
FIG. 5 is a schematic cross-sectional view illustrating an example of a voltage detector in the present disclosure.

Also, as shown in FIG. 5, first electrode body 10 and second electrode body 20 may have insulating protective layer 70 on the side thereof, and first intermediate portion 62 may be placed on the surface of insulating protective layer 70, and further, may be covered with coating layer 71. By covering first intermediate portion 62 with coating layer 71, mechanical loads applied to first intermediate portion 62 (such as vibration and impact) may be reduced advantageously. Coating layer 71 may cover at least a part of the surface of first intermediate portion 62 facing away from insulating protective layer 70, and may cover the entire surface. Examples of the material of the coating layer may include the same materials as those of insulating protective layer described above. The structure shown in FIG. 5 is obtained, for example, by placing first intermediate portion 62 on the surface of insulating protective layer 70, and then, forming coating layer 71 that coats first intermediate portion 62, using the same or different resin as the resin used for insulating protective layer 70.

Figure 6A:
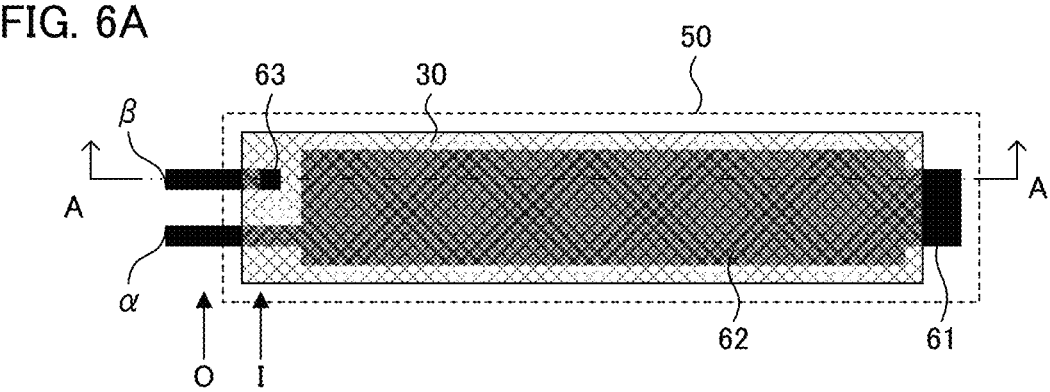
FIGS. 6A and 6B are a schematic plan view and schematic cross-sectional view illustrating an example of a voltage detector in the present disclosure.
Figure 6B:
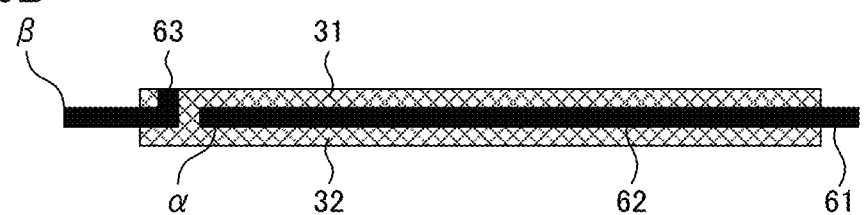

FIG. 6A is a schematic plan view illustrating an example of a voltage detector in the present disclosure, and FIG. 6B is a cross-sectional view taken along line A-A in FIG. 6A. As shown in FIGS. 6A and 6B, voltage detector α includes inner terminal portion 61 connected to the connecting portion (not shown in the figures), an outer terminal portion (not shown in the figures) placed in outer region O of exterior body 50, and first intermediate portion 62 placed between inner terminal portion 61 and the outer terminal portion, and also placed in inner region I of exterior body 50. Meanwhile, voltage detector β includes an outer terminal portion (not shown in the figures) placed in outer region O of exterior body 50, and inner terminal portion 63 placed in inner region I of exterior body 50, and connected to electrode tab Q (not shown in the figures).

Also, as shown in FIGS. 6A and 6B, first intermediate portion 62 is preferably placed inside insulating member 30. For example, as compared to FIG. 4 described above, although there is a possibility that the manufacturing cost is slightly higher, there are advantages that the short circuit in first intermediate portion 62 may be suppressed, while reducing the width (the length in the direction perpendicular to the thickness direction) of insulating protective layer 70. As shown in FIGS. 6A and 6B, first intermediate portion 62 preferably includes a planar region.

Also, as shown in FIG. 6B, first insulating layer 31 is placed on one surface of first intermediate portion 62, and second insulating layer 32 is placed on the other surface of first intermediate portion 62. First insulating layer 31 and second insulating layer 32 may include the same resin, and may include different resins. For example, after voltage detector α and voltage detector β are placed on second insulating layer 32, first insulating layer 31 covering voltage detector α and voltage detector β may be formed using the same resin as or different resin from the resin used for second insulating layer 32.

Further, in a plan view, first intermediate portion 62 is preferably larger than a battery reaction region of the first electrode body and a battery reaction region of the second electrode body. When first intermediate portion 62 is smaller than the battery reaction region, a step difference may occur, and may cause cracking of the electrode or the battery reaction may be uneven. Meanwhile, when first intermediate portion 62 is larger than the battery reaction region, there is an advantage that a problem due to the step difference is less likely to occur. Also, the battery reaction region of the first electrode body is referred to as a region wherein the both of the cathode layer and the anode layer overlap in plan view. The same applies to the battery reaction region in the second electrode body.

Also, as shown in FIG. 1, cathode terminal 110 and anode terminal 120 may be placed on the identical side of the electrode body. In such case, the battery structure may be simplified, and the volume energy density may be easily improved. Also, when cathode terminal 110 and anode terminal 120 are placed on the identical side of the electrode body, it is preferable that cathode terminal 110 and anode terminal 120 are placed so as not to overlap with each other in plan view. The reason therefor is to suppress the short circuit. Also, the derivation portion (a portion wherein voltage detector α is derived from inside exterior body 50 to outside thereof) of voltage detector α may also be placed on the identical side. In this case, the volume energy density may further be improved.

Figure 7:
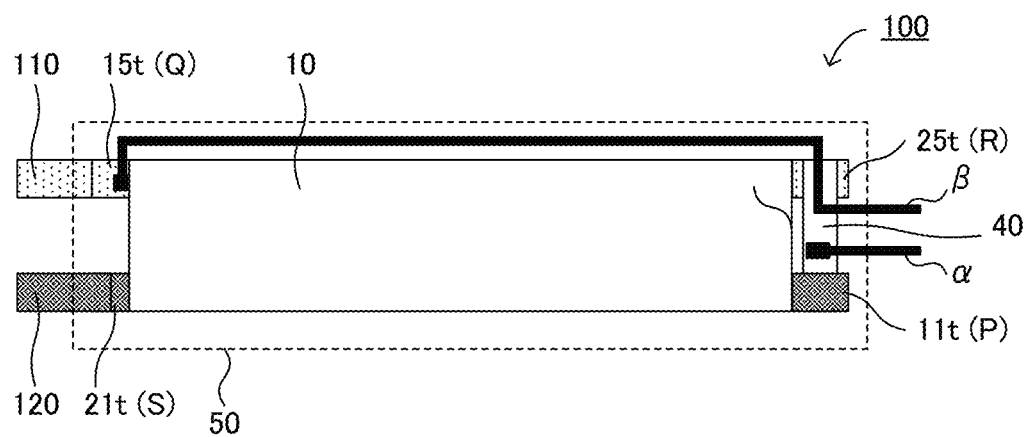
FIG. 7 is a schematic plan view illustrating an example of a voltage detector in the present disclosure.

Also, as shown in FIG. 7, cathode terminal 110 and anode terminal 120 may be placed on the identical side of the electrode body, and the derivation portion of voltage detector α may not be placed on the identical side. In FIG. 7, the derivation portion of voltage detector α is placed on the side opposing to the side where cathode terminal 110 and anode terminal 120 are placed. In this case, cathode terminal 110 and anode terminal 120, and voltage detector α may be prevented from contacting each other at outer region of the exterior body. The cathode terminal and the anode terminal may be placed on different sides opposing to each other, in the electrode body.

When the number of electrode bodies included in the battery in the present disclosure is regarded as "N", the number of "N" may be 2, and may be 3 or more. Meanwhile, the number of "N" is, for example, 100 or less. When the battery in the present disclosure includes the first electrode body to the N-th electrode body (2≤N), the electrode tab $T_{N-1}$ in the (N−1)th electrode body and the electrode tab $T_N$ in the Nth electrode body are preferably connected to each other in the inner region of the exterior body. Incidentally, the electrode tab $T_{N-1}$ and the electrode tab $T_N$ have the opposite polarity to each other. Also, as the voltage detector, the battery preferably includes voltage detector $α_{N-1}$ connected to connecting portion of the electrode tab $T_{N-1}$ and the electrode tab $T_N$. Also, the voltage of the (N−1)th electrode body may be determined by calculating the difference between the potential at voltage detector $α_{N-1}$ and the potential at voltage detector $α_{N-2}$. When the battery in the present disclosure includes the first electrode body to the N-th electrode body (2≤N), the battery preferably includes a plurality of voltage detectors a corresponding to all the connecting portions. Also, the first electrode body to the Nth electrode body are preferably same member. Also, the battery in the present disclosure may include a plurality of insulating members, and the insulating members may be placed between adjacent electrode bodies, respectively.

2. Configuration of Electrode Body

Figure 8A:
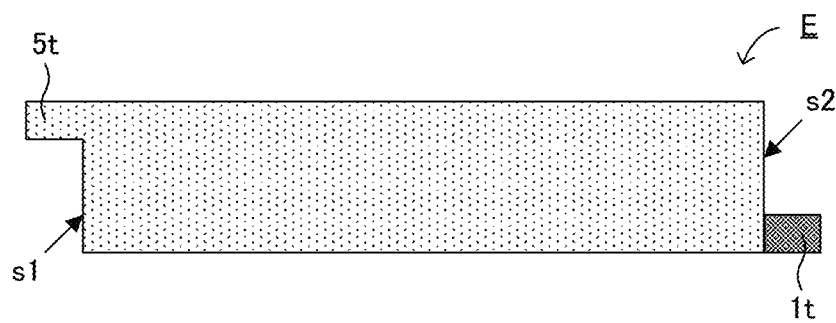
FIGS. 8A and 8B are a schematic plan view and schematic cross-sectional view illustrating an example of an electrode body in the present disclosure.
Figure 8B:
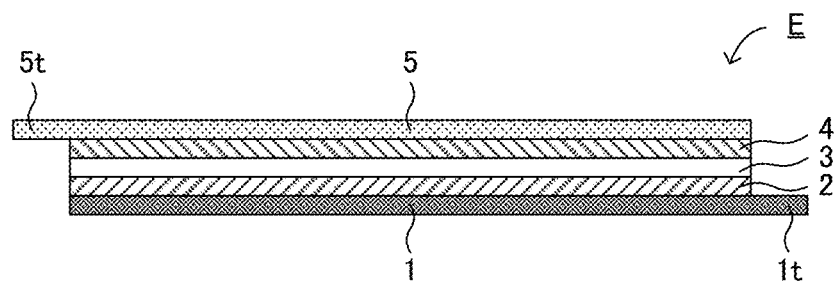

FIG. 8A is a schematic plan view illustrating an electrode body in the present disclosure, and FIG. 8B is a side view of FIG. 8A. Electrode body E shown in FIGS. 8A and 8B includes: cathode layer 4; anode layer 2; separator layer 3 placed between cathode layer 4 and anode layer 2; cathode current collector 5 configured to collect current of cathode layer 4; and anode current collector 1 configured to collect current of anode layer 2. Cathode current collector 5 includes cathode tab 5t at a position that does not overlap with cathode layer 4, in plan view. Similarly, anode current collector 1 includes anode tab 1t at a position that does not overlap with anode layer 2, in plan view. Cathode current collector 5 and cathode tab 5t may be one member, and may be different members, as long as they are electrically connected to each other. This also applies to anode current collector 1 and anode tab 1t.

Also, in plan view, as shown in FIG. 8A, cathode tab 5t and anode tab 1t may be respectively placed at different sides (side s1, side s2) opposing to each other (both-side tab structure). Meanwhile, although not shown in the figures, the cathode tab and the anode tab may be placed on the identical side respectively (one-side tab structure). Also the plan-view shape of the electrode body (plan-view shape excluding cathode tab and anode tab) is, for example, a rectangular shape. As shown in FIG. 8A, the plan-view shape of electrode body E excluding cathode tab 5t and anode tab 1t is a rectangular shape. Cathode tab 5t and anode tab 1t are place to oppose to each other in the longitudinal direction of electrode body E.

The electrode body in the present disclosure may include one power generation element including a cathode layer, a separator layer, and an anode layer, may include two of them, and may include three or more of them. When the electrode body includes a plurality of power generation elements, they may be connected in parallel and may be connected in series.

FIG. 9 is a schematic cross-sectional view illustrating an example of an electrode body in the present disclosure, and is a schematic cross-sectional view illustrating a condition wherein a plurality of power generation elements are connected in parallel. Electrode body E shown in FIG. 9 includes: anode current collector 1; first anode layer 2a, first separator layer 3a, first cathode layer 4a, and first cathode current collector 5a placed in this order from one surface s11 of anode current collector 1; and second anode layer 2b, second separator layer 3b, second cathode layer 4b, and second cathode current collector 5b placed in this order from another surface s12 of anode current collector 1. First cathode current collector 5a and second cathode current collector 5b are connected to each other, and constitute cathode tab 5t. Also, insulating protective layer 7 is placed between second cathode current collector 5b and side surface of anode (anode current collector 1, first anode layer 2a, and second anode layer 2b) in order to prevent a short circuit.

Electrode body E shown in FIG. 9 is useful as, for example, an electrode body used in an all solid state battery including an inorganic solid electrolyte such as oxide solid electrolyte, and sulfide solid electrolyte. In an all solid state battery including an inorganic solid electrolyte, the electrode body must be pressed at very high pressures in order to form good ion conducting paths. In this case, since the configuration of the other layers is symmetrical with respect to anode current collector 1, electrode E shown in FIG. 9 is advantageous in that a stress due to the difference in the stretching ability of the cathode layer and the anode layer is not likely to be generated. Specifically, in electrode body E shown in FIG. 9, first anode layer 2a, first separator layer 3a, first cathode layer 4a, and first cathode current collector 5a are placed in this order on one surface s11 with respect to anode current collector 1, and second anode layer 2b, second separator layer 3b, second cathode layer 4b, and second cathode current collector 5b are placed in this order on another surface s12. Since the configuration of the other layers is symmetrical with respect to anode current collector 1 as described above, a stress due to the difference in the stretching ability of the cathode layer and the anode layer is not likely to be generated. As the result, the breakage of the anode current collector and cracking of the cathode layer and the anode layer may be suppressed. Also, in the present disclosure, a plurality of electrode bodies E shown in FIG. 9 may be used, and these may be stacked in the thickness direction to form one electrode body E'. At this time, the opposing cathode current collector (first cathode current collector 5a in one electrode body E and second cathode current collector 5b in another electrode body E) may be different member with each other, and may be one member (one cathode current collector may be shared).

Also, electrode body E shown in FIG. 9 includes two cathode current collectors per one anode current collector. Meanwhile, the electrode body in the present disclosure may include two anode current collectors per one cathode current collector. That is, the electrode body in the present disclosure may include a cathode current collector; a first cathode layer, a first separator layer, a first anode layer and a first anode current collector, placed in this order from one surface of the cathode current collector; and a second cathode layer, a second separator layer, a second anode layer and a second anode current collector, placed in this order from another surface of the cathode current collector. In this case, the first anode current collector and the second anode current collector may be connected to constitute an anode tab.

Figure 10:
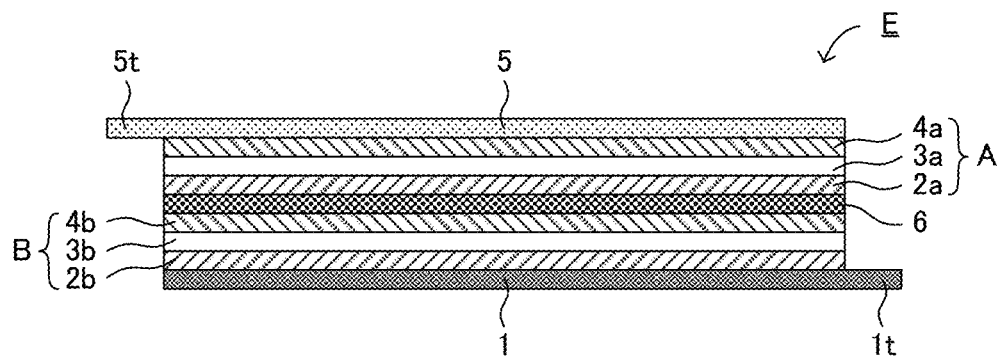
FIG. 10 is a schematic cross-sectional view illustrating an example of an electrode body in the present disclosure.

FIG. 10 is a schematic cross-sectional view illustrating an electrode body in the present disclosure, and is a schematic cross-sectional view illustrating a condition wherein a plurality of power generation elements are connected in series. Electrode body E shown in FIG. 10 includes power generation element A including first cathode layer 4a, first separator layer 3a, and first anode layer 2a, and power generation element B including second cathode layer 4b, second separator layer 3b, and second anode layer 2b. First cathode layer 4a in power generation element A is connected to cathode current collector 5, and second anode layer 2b in power generation element B is connected to anode current collector 1. Also, first anode layer 2a in power generation element A and second cathode layer 4b in power generation element B are electrically connected via intermediate current collector 6.

The cathode layer includes at least a cathode active material. Further, the cathode layer may include at least one of a conductive material, an electrolyte, and a binder. Examples of the cathode active material may include an oxide active material. Examples of the oxide active material may include rock salt bed type active materials such as $LiNi_{1/3}Co_{1/3}Mn_{1/3}O_2$; spinel type active materials such as $LiMn_2O_4$; and olivine type active materials such as $LiFePO_4$. Also, sulfur (S) may be used as the cathode active material. Examples of the shape of the cathode active material may include a granular shape. Examples of the conductive material may include a carbon material. The electrolyte may be a liquid electrolyte, and may be a solid electrolyte. The liquid electrolyte (electrolyte solution) includes, for example, supporting salts such as $LiPF_6$ and a solvent such as a carbonate-based solvent. The solid electrolyte may be an organic solid electrolyte such as a gel electrolyte, and may be an inorganic solid electrolyte such as an oxide solid electrolyte and a sulfide solid electrolyte. Also, examples of the binder may include a rubber-based binder and a fluoride-based binder.

The anode layer includes at least an anode active material. Further, the anode layer may include at least one of a conductive material, an electrolyte, and a binder. Examples of the anode active material may include a metallic active material such as Li and Si; a carbon active material such as graphite; and an oxide active material such as $Li_4Ti_5O_{12}$. Examples of the shape of the anode active material may include a granular shape and foil shape. The conductive material, the electrolyte, and the binder are the same as those described above. The separator layer includes at least an electrolyte. The electrolyte may be a liquid electrolyte and may be a solid electrolyte. Also, examples of the material of the cathode current collector may include aluminum, SUS, nickel, and carbon. Examples of the material of the anode current collector may include copper, SUS, nickel, and carbon. The shapes of the cathode current collector and the anode current collector are, for example, a foil shape.

3. Battery

Battery in the present disclosure includes an exterior body including an inner region configured to house the electrode body. The exterior body may or may not have flexibility. Examples of the former may include an aluminum laminate film, and examples of the latter may include a case made of SUS. Also, when the exterior body is a laminated film, a sealing region wherein the inner resin layers of the laminated film are melted, may be included between the inner region and the outer region of the exterior body.

The kind of the battery in the present disclosure is not particularly limited; and is typically a lithium ion secondary battery. Further, the use of battery in the present disclosure is not particularly limited, and examples thereof may include a power supply of a vehicle such as a hybrid electric vehicle, a battery electric vehicle, a gasoline-powered vehicle, and a diesel-powered vehicle. In particular, it is preferably used in the driving power supply of a hybrid electric vehicle, or a battery electric vehicle. Also, the battery in the present disclosure may be used as a power source for moving objects other than vehicles, such as railroad vehicles, ships, and airplanes, or may be used as a power source for electric appliances such as information processing apparatuses.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

REFERENCE SIGNS LIST

1 . . . anode current collector
1t . . . anode tab
2 . . . anode layer
3 . . . separator layer
4 . . . cathode layer
5 . . . cathode current collector
5t . . . cathode tab
10 . . . first electrode body
20 . . . second electrode body
30 . . . insulating member
40 . . . connecting member
50 . . . exterior body
61 . . . inner terminal portion
62 . . . first intermediate portion
70 . . . insulating protective layer
100 . . . battery

What is claimed is:

1. A battery comprising a plurality of single cells and an exterior body including an inner region configured to house the plurality of single cells, and each single cell includes a first electrode body and a second electrode body,
the first electrode body includes an electrode tab P,
the second electrode body includes an electrode tab R having an opposite polarity to the electrode tab P,
the electrode tab P and the electrode tab R are connected in the inner region,
each single cell includes a voltage detector placed so as to extend from the inner region to an outer region of the exterior body, and
as the voltage detector, each single cell includes a voltage detector α connected to a connecting portion of the electrode tab P and the electrode tab R,
wherein the exterior body is a member constituting the plurality of cells,
the voltage detector α includes an inner terminal portion connected to the connecting portion, an outer terminal portion placed in the outer region, and a first intermediate portion placed between the inner terminal portion and the outer terminal portion and also placed in the inner region, and
the first intermediate portion includes a planar region having a width larger than a width of a smallest portion of the voltage detector in at least a part thereof.

2. The battery according to claim 1, wherein the first electrode body includes an electrode tab Q having an opposite polarity to the electrode tab P,
the second electrode body includes an electrode tab S having an opposite polarity to the electrode tab R, and
as the voltage detector, the battery includes at least one of a voltage detector β connected to the electrode tab Q and a voltage detector γ connected to the electrode tab S.

3. The battery according to claim 1, wherein the first electrode body and the second electrode body of each cell are stacked along a thickness direction via an insulating member.

4. The battery according to claim 3, wherein the first electrode body and the second electrode body respectively include:
an anode current collector,
a first anode layer, a first separator layer, a first cathode layer, and a first cathode current collector, placed in this order from one surface of the anode current collector, and
a second anode layer, a second separator layer, a second cathode layer, and a second cathode current collector, placed in this order from another surface of the anode current collector.

5. The battery according to claim 1, wherein the first electrode body and the second electrode body of each cell include an insulating protective layer on a side thereof, and the first intermediate portion is placed on a surface of the insulating protective layer.

6. The battery according to claim 3, wherein the first intermediate portion is placed inside the insulating member.

7. The battery according to claim 6, wherein, in a plan view, the first intermediate portion is larger in area than a battery reaction region of the first electrode body and a battery reaction region of the second electrode body.

8. The battery according to claim 1, wherein the exterior body is a laminated film.

9. The battery according to claim 1, wherein the exterior body covers the entirety of a plurality of electrode bodies.

10. The battery according to claim 1, wherein the electrode tab P and the electrode tab R are placed on the identical side of the electrode bodies.

* * * * *